United States Patent [19]

Sugiyama et al.

[11] Patent Number: 4,486,790
[45] Date of Patent: Dec. 4, 1984

[54] DRIVE CIRCUIT FOR FEEDING A REPRODUCING ELEMENT ACROSS A ROTARY MEDIUM HAVING SIGNALS RECORDED THEREON

[75] Inventors: Hiroyuki Sugiyama, Isehara; Ryozo Abe, Yokohama; Susumu Sakakibara, Sagamihara, all of Japan

[73] Assignee: Victor Company of Japan, Ltd., Yokohama, Japan

[21] Appl. No.: 343,998

[22] Filed: Jan. 29, 1982

[30] Foreign Application Priority Data

Jan. 30, 1981 [JP] Japan .................................. 56-12570

[51] Int. Cl.³ ........................ H04N 5/76; G11B 21/10
[52] U.S. Cl. ........................................ 358/342; 369/43
[58] Field of Search ............................ 369/43, 44, 47; 358/342, 310, 335

[56] References Cited

U.S. PATENT DOCUMENTS 3,919,697 11/1975 Walker .
4,315,283 2/1982 Kinjo et al. ........................ 369/44 X

FOREIGN PATENT DOCUMENTS 2273340 12/1975 France .
2451086 10/1980 France .
2456363 12/1980 France .
56-134359 10/1981 Japan .
57-66571 4/1982 Japan .

Primary Examiner—Robert L. Richardson
Attorney, Agent, or Firm—Louis Bernat

[57] ABSTRACT

A reproducing element feeding and driving circuit is provided in a rotary recording medium reproducing apparatus consisting of a signal pickup device having a reproducing element for reproducing recorded signals from a rotary recording medium, a feeding mechanism for feeding the signal pickup device, and a tracking error signal obtaining circuit for obtaining a tracking error signal so as to perform tracking control with respect to the reproducing element. The feeding and driving circuit comprises a sampling circuit for sampling the tracking error signal when the reproducing element is reproducing a point on the rotary recording medium corresponding to one of a plurality of pairs of points on the rotary recording medium, where the pairs of points are points which are at symmetrical positions along a diametrical direction of the rotary recording medium with respect to a center of the rotary recording medium, averaging circuit for averaging a value sampled by the sampling circuit and obtaining a signal substantially corresponding to a DC component of the tracking error signal, and a feed pulse applying circuit for obtaining a feed pulse having a pulse width which is in accordance with the DC component obtained from the averaging circuit and applying the feed pulse thus obtained to the feeding mechanism.

6 Claims, 9 Drawing Figures

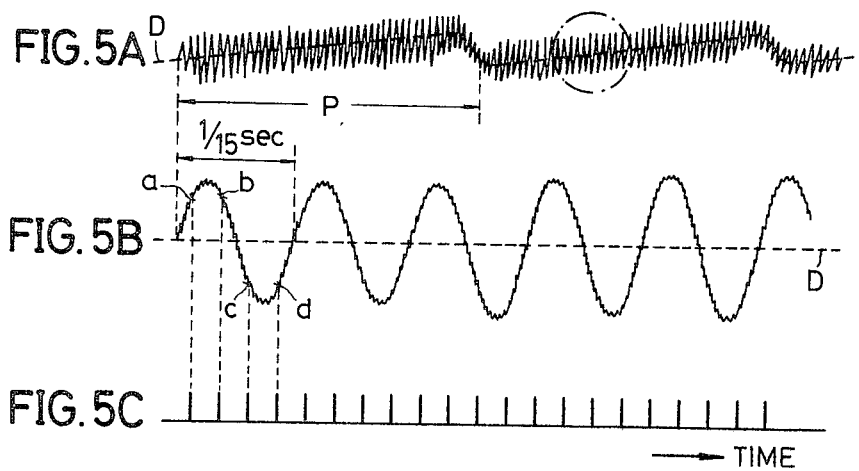
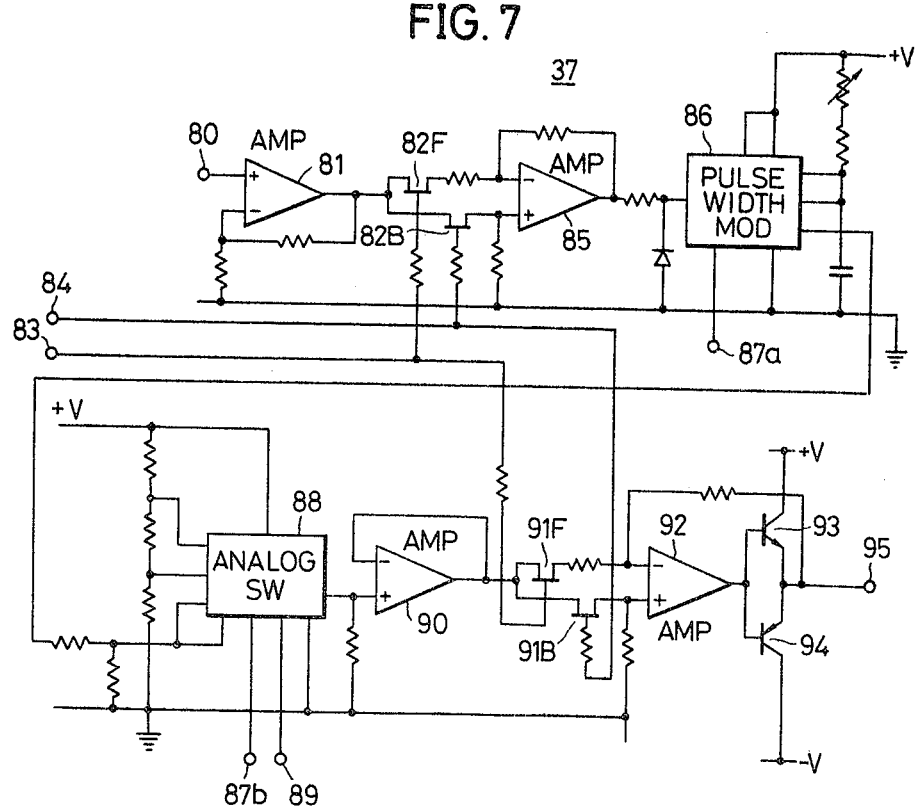

DRIVE CIRCUIT FOR FEEDING A REPRODUCING ELEMENT ACROSS A ROTARY MEDIUM HAVING SIGNALS RECORDED THEREON

BACKGROUND OF THE INVENTION

The present invention generally relates to reproducing element feeding and driving circuits in rotary recording medium reproducing apparatuses, and more particularly to a circuit for feeding and driving a reproducing element so that the reproducing element is stably controlled of its tracking and fed over tracks on a rotary recording medium even when the feeding speed is high, in a rotary recording medium reproducing apparatus having a feeding device for feeding the reproducing element which reproduces signals from the rotary recording medium.

A new information signal recording and/or reproducing system has been proposed in a U.S. patent application Ser. No. 785,095 entitled "INFORMATION SIGNAL RECORDING SYSTEM" filed Apr. 6, 1977, now U.S. Pat. No. 4,331,976 granted May 25, 1982 of which the assignee is the same as that of the present application. According to this proposed system, the recording system forms pits in accordance with the information signal being recorded along a spiral track on a flat disc-shaped recording medium (hereinafter referred to as a disc), without forming a groove therein. In this reproducing system, a reproducing stylus traces over along this track thereby to reproduce the recorded information signal in response to variations in electrostatic capacitance.

In this system, since no grooves for guiding the reproducing stylus are provided on the disc, it becomes necessary to record pilot or reference signals on or in the vicinity of a track of the information signal such as a video signal, on the disc. Upon reproduction, the reference signals are reproduced together with the video signal. Tracking control is carried out so that the reproducing stylus accurately traces along the track in response to the reproduced reference signals.

By the use of this previously proposed system, there is no possibility whatsoever of the reproducing stylus or the disc being damaged since the recording track has no groove. The reproducing stylus can trace the same portion of the track repeatedly many times, whereby a special reproduction such as still, slow-motion, or quick-motion reproduction becomes possible.

During normal reproduction, the reproducing stylus advances by one track pitch for one revolution of the disc, in a state controlled of its tracking. On the other hand, a carriage provided with a signal pickup device including the reproducing stylus, follows and moves once every time the reproducing stylus advances by thirty-two track pitches, for example. In this carriage feeding mechanism, a DC motor for feeding the carriage is rotated by a feed pulse having a pulse period which is in accordance with a reproducing mode and a pulse width which is in accordance with a DC component of a reproducing stylus tracking error signal.

The disc which is recorded with four fields of video signals for each track turn, for example, is rotated at a rotational speed of 900 rpm, that is, 15 rps. In this case, due to eccentricity and the like of the disc, an unwanted signal having a frequency of 15 Hz is multiplexed with the tracking error signal. Here, in order to accurately feed the carriage, it is necessary to eliminate this signal of 15 Hz.

Accordingly, the present inventors have tested a method in which a lowpass filter is used to eliminate the unwanted signal of 15 Hz. However, when the eccentricity of the disc is large, for example, the level of the above unwanted signal component also becomes high, and there are cases where the unwanted signal cannot be sufficiently eliminated by use of the lowpass filter. Furthermore, when the signal is passed through the lowpass filter, a time delay is introduced in the passed signal by the lowpass filter, and the tracking error signal is not accurately transmitted as a feeding error information. Particularly, during a sixty-five-times speed fast-motion reproduction, for example, it becomes necessary to shift the reproducing stylus to an adjacent track sixty-four times for one revolution of the disc. However, when this kind of a fast-motion reproduction is continuously performed for a long time, the feeding error is accumulated and becomes a large value due to the time delay introduced by the lowpass filter. In this case, the feeding of the carriage cannot sufficiently follow the tracking error correcting operation of the reproducing stylus. Hence, there was a disadvantage in that the tracking with respect to the reproducing stylus is eventually lost.

SUMMARY OF THE INVENTION

Accordingly, it is a general object of the present invention to provide a novel and useful reproducing element feeding and driving circuit in a rotary recording medium reproducing apparatus, in which the above described disadvantages have been overcome.

Another and more specific object of the present invention is to provide a reproducing element feeding and driving circuit in a rotary recording medium reproducing apparatus, in which a tracking error signal for controlling the tracking of a reproducing element is sampled at points where the reproducing element reproduces symmetrical points along a diametrical direction of a rotary recording medium with respect to its center, and the sampled value is averaged to obtain a DC component so that the reproducing element is transferred along the radial direction of the rotary recording medium according to this DC component. According to the circuit of the present invention, an unwanted signal included within the tracking error signal due to eccentricity and the like of the rotary recording medium is finely eliminated, to provide an accurate reproducing element feeding and driving signal.

Other objects and further features of the present invention will be apparent from the following detailed description when read in conjunction with the accompanying drawings.

BRIEF DESCRIPTION OF THE DRAWINGS

FIGS. 5A, 5B, and 5C respectively show signal waveforms for explaining the operation of a reproducing element feeding and driving circuit within the block system shown in FIG. 1;

FIG. 7 is a systematic circuit diagram showing an embodiment of a concrete circuit of a feed pulse forming circuit part within the block system shown in FIG. 1.

DETAILED DESCRIPTION

Figure 1:
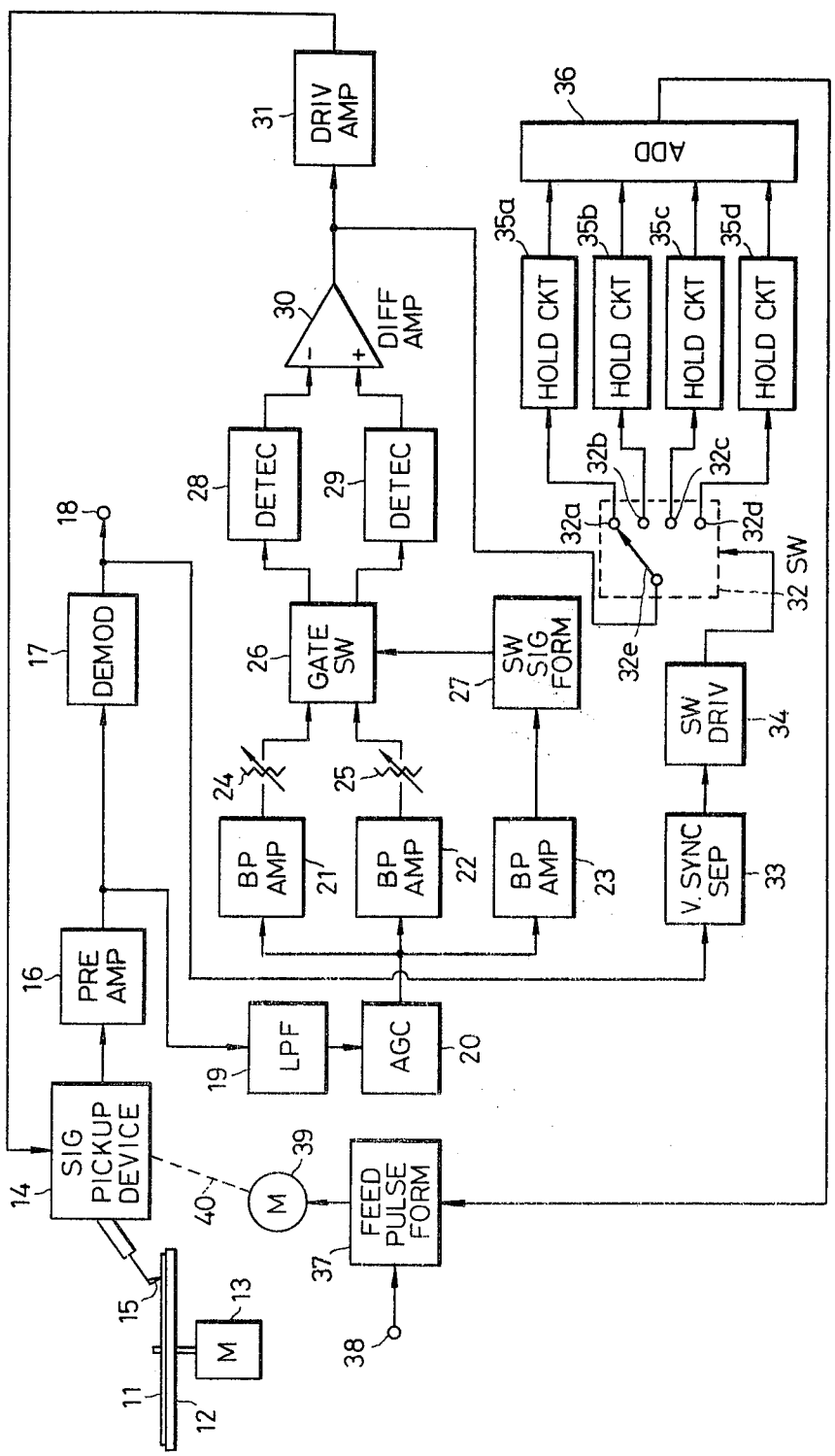
FIG. 1 is a systematic block diagram showing a rotary recording medium reproducing apparatus provided with an embodiment of a reproducing element feeding and driving circuit according to the present invention.

In FIG. 1, a rotary recording medium (hereinafter simply referred to as a disc) 11 is placed onto a turntable 12, and rotated by a motor 13 at a rotational speed of 900 rpm, for example. A signal pickup device 14, used as a reproducing transducer, has a reproducing stylus 15. The reproducing stylus 15 moves continuously and linearly in a direction from the outer peripheral part to the inner peripheral part at a speed equal to the distance of one track pitch per revolution of the turntable 12, during a forward normal reproduction mode. Accordingly, the stylus 15 of the signal pickup device 14 travels radially across the rotating disc 11 and relatively traces over the spiral track of the disc 11.

Figure 2:
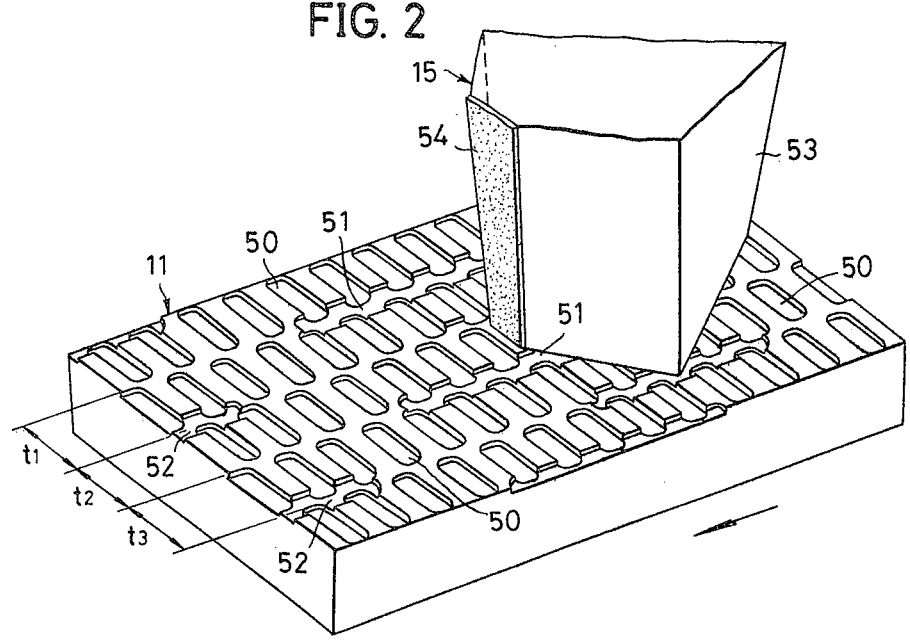
FIG. 2 is a perspective view in an enlarged scale, showing a part of a rotary recording medium together with a tip end part of a reproducing stylus.

A video signal is recorded on a spiral track with pits formed on the disc 11 according to the information contents of the signal. One part of this track is shown in an enlarged scale in FIG. 2. In FIG. 2, track turns of a single continuous spiral track, corresponding to each revolution of the disc 11, are designated by t1, t2, t3, .... Each track turn is constituted by the formation of pits 50 of a main information signal along a plane track path and has no stylus guide groove formed therein. With respect to one track turn t1, in every horizontal scanning period (e,uns/H/ ) at a position corresponding to the horizontal blanking period, pits 51 of a first reference signal fp1 are formed on one lateral side of the track as viewed in the track path direction. Pits 52 of a second reference signal fp2 are formed on the other side of the track.

In an intermediate position between the centerlines of adjacent track turns, only pits of either one kind of the pits 51 and 52 of the above reference signals fp1 and fp2 are formed, and moreover, with respect to one track, the sides on which the pits 51 and 52 are formed are alternated for every track turn. That is, if the pits 51 and 52 are respectively formed on the right and left sides of one track turn, for example, the pits 52 and 51 will respectively be formed on the right and left sides of each of the adjacent track turns.

The tip end of the reproducing stylus 15 has a shape shown in FIG. 2. The reproducing stylus 15 is constituted by a stylus structure 53 having a disc tracing surface which has a width greater than a track width, and an electrode 54 fixed to the rear face of the stylus structure 53. As the reproducing stylus 15 traces along a track on the disc 11 rotating in a direction indicated by an arrow, the video signal recorded thereon by the formation of pits is reproduced as variations in the electrostatic capacitance between the surface of the disc 11 and the electrode 54 of the reproducing stylus 15.

Figure 3:
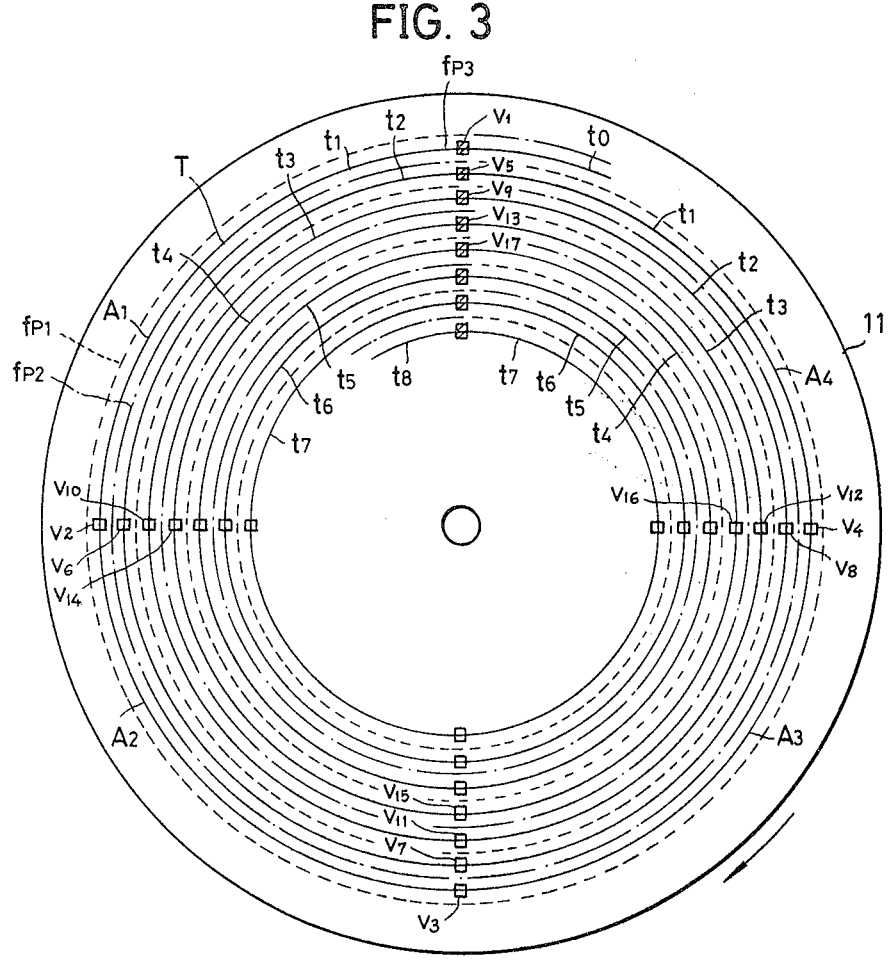
FIG. 3 shows an example of a track pattern formed on a rotary recording medium.

On the disc 11, as indicated in FIG. 3, a video signal is recorded along a spiral track T for two frames, that is, four fields, per one revolution of the disc 11. In FIG. 3, the tracks of the reference signal fp1 is shown by dotted lines while the reference signal fp2 is shown by one-dot chain lines. The positions of the vertical synchronizing signals of respective fields are designated by reference characters V1, V2, V3, ..., and the successive track parts corresponding to one revolution of the disc of a single spiral track T will respectively be designated by track turns t1, t2, t3, .... Furthermore, a third reference signal fp3 is recorded at the starting end positions V1, V5, V9, ... of each of the track turns t1, t2, t3, ..., that is, at positions where the reference signals fp1 and fp2 change over. A video signal of four fields, namely A1, A2, A3, and A4, is recorded in the track t1.

Figure 4:
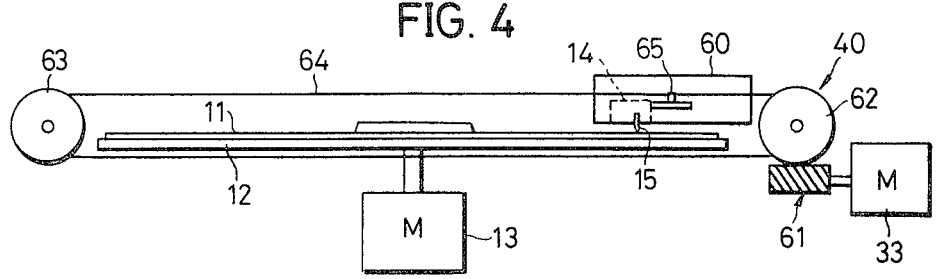
FIG. 4 is a side view of a rotary recording medium reproducing apparatus, showing a carriage feeding mechanism provided with a signal pickup device.

The signal pickup device 14 is along the radial direction of the disc 11 by a feeding mechanism 40 shown in FIG. 4 which is driven by a feed motor 39. The signal pickup device 14 is mounted to a carriage 60 which is guided by guide rails (not shown). A rope 64 is provided across between a driving wheel 62 which is rotated by the feed motor 39 through a rotation transmitting mechanism 61, and a driven wheel 63. A part of the rope 64 is held by a stud 65 which is fixedly provided on the carriage 60. Accordingly, the driving wheel 62 is rotated by the rotation of the motor 39. As the rope 64 moves, the carriage 60 is accordingly moved, and the signal pickup device 14 moves along the radial direction of the disc 11. Upon a normal reproduction in the forward direction, tracking control is performed with respect to the reproducing stylus 15 by a tracking control methanism (not shown) of the signal pickup device 14. Therefore, when the reproducing stylus 15 moves by thirty-two track pitches, the motor 39 is supplied with a feed pulse and rotated by an angle according to the pulse width of that feed pulse. Moreover, the signal pickup device 14 is transferred together with the carriage 60, so that the shift of thirty-two track pitches between the reproducing stylus 15 becomes zero.

In the system shown in FIG. 1, a reproduced signal picked up from the disc 11 as minute variations in the electrostatic capacitance by the reproducing stylus 15 of the signal pickup device 14, is supplied to a preamplifier 16 having a resonant circuit. The resonance frequency of the resonant circuit varies in response to this variation in the electrostatic capacitance, and is formed into a signal of a desired level. The resulting output of the preamplifier 16 is demodulated into the original video signal by a demodulator 17 and is obtained as an output through an output terminal 18.

The output signal of the preamplifier 16 is supplied to a lowpass filter 19 wherein the reference signals fp1, fp2, and fp3 are separated. The output reference signals pass through an automatic gain control circuit 20 and are respectively supplied to amplifiers 21, 22, and 23. Here, each of the amplifiers 21, 22, and 23 are a kind of a bandpass amplifier respectively designed to have steep passing frequency characteristics at only the respective frequency fp1, fp2, and fp3. As a result, the signals having frequencies fp1 and fp2 are respectively separated and obtained from the amplifiers 21 and 22. These signals respectively pass through level adjustors 24 and 25, wherein the levels of the signals are adjusted. The resulting signals are then supplied to a gate switching circuit 26.

The reference signal fp3 thus separated and amplified at the amplifier 23, is supplied to a switching signal forming circuit 27. The gate switching circuit 26 performs switching of the reference signals fp1 and fp2 every one revolution period of the disc 11 upon normal reproduction, in response to the switching signal formed by the switching signal forming circuit 27 which is applied thereto. Hence, due to the switching signal which reverses polarity every two frames (1/15 seconds), the signals fp1 and fp2 are always alternately supplied to detecting circuits 28 and 29 from the gate switching circuit 26.

The detecting circuits 28 and 29 detect the envelopes of their respective input reference signals and covnert the input reference signals into DC voltages. These DC voltages are then supplied to a differential amplifier 30. The differential amplifier 30 compares the output signals of the two detecting circuits 28 and 29 which vary in response to the reproduced levels of the reference signals fp1 and fp2, and generates an output tracking error signal which indicates the direction of the tracking error and the error quality. This tracking error signal is amplified to a predetermined control voltage by a driving amplifier 31. The output signal of the driving amplifier 31 is supplied to a coil of the tracking control mechanism within the signal pickup device 14 as a control signal, to control the signal pickup device 14. As a result, tracking control is performed with respect to the reproducing stylus 15 so that the above tracking error signal becomes zero, that is, so that the reproducing stylus 15 correctly traces over the track T of the disc 11.

The output tracking error signal of the differential amplifier 30 is supplied to the driving amplifier 31 as described above, and also supplied to a changeover contact 32e of a switcher 32. The switcher 32 is constructed from an analog switch such as an electronic switch, however, in FIG. 1, the switcher 32 is shown as a mechanical switch in order to simplify the explanation.

On the other hand, the output demodulated video signal from the demodulator 17 is supplied to a vertical synchronizing signal separation circuit 33 wherein the vertical synchronizing signal is separated. The separated vertical sychronizing signal is reproduced when the reproducing stylus 15 traces the positions V1 (V5, V9, ...), V2 (V6, V10, ...), V3 (V7, V11, ...), and V4 (V8, V12, ...), and is obtained at a rate of four per one revolution of the disc 11. The above vertical synchronizing signal is subjected to waveform shaping by being supplied to a switch driving circuit 34. A switch driving signal thus obtained from the switch driving circuit 34 is supplied to the switcher 32, so that the changeover contact 32e successively makes contact with contact points 32a, 32b, 32c, 32d, 32a, ... in a cyclic manner, for every one field period (¼ revolution of the disc 11).

As the switcher 32 is changed over and the contact 32e successively changes over to make contact with the contact points 32a, 32b, 32c, and 32d, the output of the differential amplifier 30 is sampled at four positions during one revolution of the disc 11. The sampled signal is successively supplied to holding circuits 35a, 35b, 35c, and 35d and held. The values thus held at the holding circuits 35a through 35d are supplied to an adder 36.

Held output voltages of the holding circuits 35a through 35d are added at the adder 36, and an average value of these held voltages is obtained from the adder 36. The output DC voltage, that is, the average value, from the adder 36 is supplied to a feed pulse forming circuit 37. A feed pulse having a pulse width which is in accordance with the voltage from the adder 36 is obtained from the above feed pulse forming circuit 37, and applied to the feed motor 39 consisting of a DC motor. Accordingly, the motor 39 is rotated by a certain angle, and the carriage 60 moves by a distance corresponding to the movement of the reproducing stylus 15 by thirty-two track pitches, through the feeding mechanism 40. The carriage 60 is moved for every moving internal P of the reproducing stylus 15 by thirty-two track pitches.

Description of the operation of the above circuit will now be given by referring to FIGS. 5A through 5C. The output of the differential amplifier 30 has a waveform indicated in FIG. 5A. This waveform is a waveform obtained by multiplexing the above unwanted frequency component of 15 Hz with the DC component indicating a feeding error introduced with respect to the movement of the stylus tip of the reproducing stylus 15. This DC component is periodical as indicated by a dotted line D in FIG. 5A. The interval P of one period is an interval in which the reproducing stylus 15 moves thirty-two track pitches (the interval is 2.1 seconds during a normal reproduction). The feed motor 39 is rotated for every periodical interval P to move the carriage 60, and the tracking error of the reproducing stylus 15 becomes zero.

When a part of the waveform indicated in FIG. 5A is shown in an enlarged scale, that is, if a part surrounded by an one-dot chain line is enlarged, for example, the waveform becomes as indicated in FIG. 5B. FIG. 5B is shown in a state where the time-base is enlarged with respect to that in FIG. 5A. As clearly seen from FIG. 5B, the unwanted signal component of 15 Hz (one cyclic interval of this component corresponds to one revolution of the disc 11, that is, 1/15 second) is multiplexed with the DC component, and further, a signal having a horizontal scanning frequency of 15.753 kHz is multiplexed thereto.

The output signal of the differential amplifier 30 having the waveforms indicated in FIGS. 5A and 5B is switched by a switch driving signal indicated in FIG. 5C which is obtained from the switch driving circuit, at the switcher 32. Hence, the voltages at points a, b, c, and d indicated in FIG. 5B are respectively held at the holding circuits 35a through 35d. The above points a through d correspond to four symmetrical and equi-distant points along the diametrical direction of the disc 11 where the reproducing stylus 15 is positioned. Accordingly, the held voltages are supplied to the adder 36, and the averaged DC voltage D is thus obtained.

The sampling points are not limited to the above four points. All that is required is to have even number of points (that is, 2n points, where n is an integer) corresponding to symmetrical points along the diametrical direction of the disc 11 where the reproducing stylus 15 is positioned. Furthermore, all that is required is for the pair of points to be at symmetrical positions with respect to the center of the disc. It is not essential for the adjacent points to be equi-distant from each other. In addition, the switching signal for driving the switcher 32 which performs the sampling, is not limited to the switching signal formed from the vertical synchronizing signal. For example, the above switching signal may be a signal obtained from a rotation detecting pulse generated according to the rotation of the motor 13 which rotates the disc 11.

As described above, the average DC component D thus obtained accurately describes the feeding error.

Since a lowpass filter is not used in the circuit according to the present invention when obtaining the above DC component, time delay is not introduced. For example, during a sixty-five-times fast-motion reproduction in which the reproducing stylus is kicked sixty-four times for every one revolution of the disc, the feed pulse is produced twice during one revolution of the disc since the reproducing stylus advances by sixty-four tracks during one revolution of the disc 11. Even when the carraige is to be fed quickly and successively in the manner described above, the circuit according to the present invention provides a feed pulse which is accurately in accordance with the feeding error component. Moreover, even if the eccentricity in the disc 11 is large, the circuit according to the present invention is capable of similarly providing a feed pulse which is accurately in accordance with the feeding error.

Figure 6:
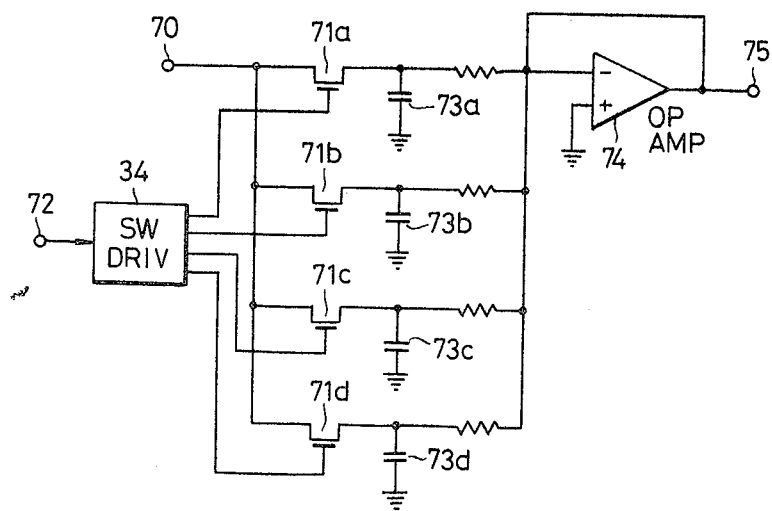
FIG. 6 is a systematic circuit diagram showing an embodiment of a concrete circuit of an essential part of the block system shown in FIG. 1.

An embodiment of a concrete circuit of a circuit part including the above switcher 32, the holding circuits 35a through 35d, and the adder 36, is shown in FIG. 6. The output signal of the differential amplifier 30 is applied to an input terminal 70. Source terminals of field-effect transistors (FETs) 71a, 71b, 71c, and 71d for switching, constructing the switcher 32, are connected to the terminal 70. The switch driving circuit 34 is supplied with the vertical synchronizing signal from the vertical synchronizing signal separation circuit 33, through a terminal 72, and successively applies an output switching signal to gate terminals of the FETs 71a through 71d. The FETs 71a through 71d are successively put into conducting states when the switching pulse is applied to their gate terminals, and signals which have passed through the conducting FETs are applied to capacitors 73a, 73b, 73c, and 73d respectively constructing the holding circuits 35a through 35d. Accordingly, the voltages applied to these capacitors 73a through 73d are held. The capacitors 73a through 73d are respectively connected to an inverting input terminal of an operational amplifier 74, through respective resistors. The operational amplifier 74 constructs the adder 36, and the above held voltages are added thereat. Thus, an averaged output signal is supplied to the feed pulse forming circuit 37 from the operational amplifier 74, through a terminal 75.

The functions of the circuit shown in FIG. 6 which corresponds to the circuit part including the switcher 32, the holding circuits 35a through 35d, and the adder 36 shown in FIG. 1, may be performed by a micro-computer.

An embodiment of a concrete circuit of the feed pulse forming circuit 37, is shown in FIG. 7. The output signal of the adder 36 is applied to drain terminals of FETs 82F and 82B for switching, through a terminal 80 and a non-inverting amplifier 81. During a forward reproduction mode in which the reproducing stylus 15 moves from the outer periphery to the inner periphery of the disc 11, the FET 82F is turned ON by a control signal supplied from a terminal 83. On the other hand, during a backward reproduction mode, the FET 82B is turned ON by a control signal supplied from a terminal 84.

An error signal which has either passed through the FET 82F or the FET 82B is applied to a terminal ⑤ of a pulse width modulator 86, through an inverting amplifier 85. Hence, the output pulse width of the pulse width modulator 86 is accordingly varied. The above pulse width modulator 86 is triggered by a trigger pulse which is applied to its terminal ② from an input terminal 87a. The pulse applied to the input terminal 87a, is a pulse which is generated once when the reproducing stylus 15 is moved by thirty-two track pitches on the disc 11. Therefore, one pulse is obtained from an output terminal ③ of the pulse width modulator 86, for every time thirty-two tracks are reproduced. Here, the width of this output pulse is a width which is in accordance with the error signal from the inverting amplifier 85.

The feed pulse obtained from the pulse width modulator 86, having a pulse width which accurately corresponds to the inclination of the stylus tip of the reproducing stylus 15, is applied to terminals ② and ④ of an analog switch 88. A pulse is applied to a terminal 10 of the analog switch 88 from an input terminal 87b, every time thirty-two tracks are reproduced. Furthermore, a high-level signal is applied to a terminal ⑨ of the analog switch 88 from an input terminal 89. When the above signals are applied to the terminals ⑨ and ⑩ of the analog switch 88, an input feed pulse is obtained from an output terminal ③ as it is. The output feed pulse is applied to drain terminals of FETs 91F and 91B, through an amplifier 90. One of the FETs 91F and 91B is turned ON according to the signals from the terminals 83 and 84, similarly as in the case of the FETs 82F and 82B.

The feed pulse from the amplifier 90 is supplied to an amplifier 92, through the FET 91F or the FET 91B which is in the ON state. The feed pulse obtained from the amplifier 92 is inverted and amplified or not inverted and amplified, according to the feeding direction. Hence, the above feed pulse is obtained from an output terminal 95 through a driving circuit consisting of transistors 93 and 94, and then supplied to the feed motor 39. The feed motor 39 rotates by a certain angle according to the pulse width of the feed pulse, every time thirty-two tracks are reproduced. Moreover, the feed motor 39 rotates towards a forward direction during a forward reproduction mode, and rotates towards a backward direction during a backward reproduction mode. Furthermore, in FIG. 1, the terminals 83, 84, 87a, 87b, and 89 shown in FIG. 7 are shown as the terminal 38.

Further, the present invention is not limited to these embodiments, but various variations and modifications may be made without departing from the scope of the present invention.

We claim:

1. A drive circuit for feeding a reproducing element across a rotary recording medium during reproduction of a signal recorded thereon, said reproducing element being part of a reproducing element having a signal pickup device with a reproducing element for reproducing said recorded signals from said rotary recording medium, feeding means for feeding said signal pickup device, and means for obtaining a tracking error signal to enable a tracking control with respect to said reproducing element, said tracking error signal being multiplexed with an unwanted signal component caused by an eccentricity of said rotary recording medium, said drive circuit comprising:

sampling means for sampling said tracking error signal when said reproducing element is reproducing a point on said rotary recording medium corresponding to one of a plurality of pairs of points on said rotary recording medium, each of said pairs of points being points which are located at symmetrical positions which are diametrically opposed to each other on the same track turn of said rotary recording medium, the symmetry of said point positions being taken with respect to a center of said rotary recording medium;

averaging means for averaging a value sampled by said sampling means, and for giving a signal which substantially corresponds to a DC component of said tracking error signal; and means for generating a feed pulse having a pulse width which is in accordance with the DC component obtained from said averaging means, and for applying said feed pulse to said feeding means.

2. A circuit as claimed in claim 1 in which said averaging means comprises holding means for holding the values respectively sampled by said sampling means, and means for adding and averaging values held by said holding means.

3. A circuit as claimed in claim 1 in which said recorded signal is a video signal, and said sampling means comprises vertical synchronizing signal separating means for separating a vertical synchronizing signal from a reproduced video signal, switching means successively switched for sampling said tracking error signal, and driving signal forming means for forming a signal for driving said switching means according to said separated vertical synchronizing signal.

4. A circuit as claimed in claim 3 in which said rotary recording medium is recorded with video signals of four fields for each track turn, said switching means switches four times for every one revolution period of said rotary recording medium, and said averaging means consists of holding means for respectively holding four values sampled by said switching means for every one revolution period, and means for adding and averaging values held by said holding means.

5. A circuit as claimed in claim 1 in which said feeding means has a DC motor for moving said signal pickup device, and said DC motor is rotated by an angle in accordance with the pulse width of said feed pulse.

6. A circuit as claimed in claim 1 in which said feeding means is moved by said feed pulse every time said reproducing element moves a pitch of a predetermined track turn of tracks on said rotary recording medium.

* * * * *